United States Patent
Franciosi et al.

(10) Patent No.: US 10,817,333 B2
(45) Date of Patent: Oct. 27, 2020

(54) MANAGING MEMORY IN DEVICES THAT HOST VIRTUAL MACHINES AND HAVE SHARED MEMORY

(71) Applicant: Nutanix, Inc., San Jose, CA (US)

(72) Inventors: Felipe Franciosi, Cambridge (GB); David Vrabel, Cambridge (GB)

(73) Assignee: NUTANIX, INC., San Jose, CA (US)

( * ) Notice: Subject to any disclaimer, the term of this patent is extended or adjusted under 35 U.S.C. 154(b) by 366 days.

(21) Appl. No.: 16/018,256

(22) Filed: Jun. 26, 2018

(65) Prior Publication Data

US 2019/0391843 A1 Dec. 26, 2019

(51) Int. Cl.
*G06F 9/455* (2018.01)
*G06F 9/48* (2006.01)
*G06F 9/54* (2006.01)
*G06F 12/1009* (2016.01)

(52) U.S. Cl.
CPC ........ *G06F 9/4856* (2013.01); *G06F 9/45558* (2013.01); *G06F 9/544* (2013.01); *G06F 12/1009* (2013.01); *G06F 2009/4557* (2013.01); *G06F 2009/45575* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 5,835,954 A | 11/1998 | Duyanovich et al. | |
| 7,624,240 B1 | 11/2009 | Colbert et al. | |
| 7,725,671 B2 | 5/2010 | Prahlad et al. | |
| 7,840,533 B2 | 11/2010 | Prahlad et al. | |
| 8,010,485 B1 | 8/2011 | Chatterjee et al. | |
| 8,356,149 B2 | 1/2013 | Young et al. | |
| 8,417,905 B2 | 4/2013 | Linde | |
| 8,447,728 B2 | 5/2013 | Prahlad et al. | |
| 8,549,518 B1 | 10/2013 | Aron et al. | |
| 8,601,473 B1 | 12/2013 | Aron et al. | |

(Continued)

OTHER PUBLICATIONS

Poitras, Steven. "The Nutanix Bible" (Jan. 11, 2014), from stevenpoitras.com/the-nutanix-bible/ (Publication date based on indicated capture date by Archive.org; first publication date unknown).

(Continued)

*Primary Examiner* — Bing Zhao
(74) *Attorney, Agent, or Firm* — Foley & Lardner LLP (57) ABSTRACT

A system and method include initiating a live migration of a virtual machine from a first host machine to a second host machine. A shared host physical storage includes first swapped out memory data associated with the first virtual machine from a first memory of the first host machine, and metadata including location information of the first swapped out memory data, and an identity of the associated first virtual machine. The system and method include copying memory data associated with the first virtual machine stored in the first memory to the second host machine. The system and method also include accessing, by a second hypervisor at the second host machine, the metadata stored in the shared host physical storage to determine location of the first swapped out memory data associated with the first virtual machine.

22 Claims, 5 Drawing Sheets

(56) References Cited

U.S. PATENT DOCUMENTS

| | | | |
|---|---|---|---|
| 8,762,335 B2 | 6/2014 | Prahlad et al. | |
| 8,850,130 B1 | 9/2014 | Aron et al. | |
| 9,183,035 B2 * | 11/2015 | Bacher | G06F 9/45558 |
| 9,183,036 B2 | 11/2015 | Bacher et al. | |
| 9,342,346 B2 * | 5/2016 | Maislos | G06F 9/45558 |
| 9,354,906 B1 | 5/2016 | Uchronski et al. | |
| 9,396,014 B2 | 7/2016 | Chen et al. | |
| 9,740,723 B2 | 8/2017 | Prahlad et al. | |
| 9,772,866 B1 | 9/2017 | Aron et al. | |
| 10,152,428 B1 * | 12/2018 | Alshawabkeh | G06F 11/34 |
| 10,210,048 B2 | 2/2019 | Sancheti | |
| 10,248,657 B2 | 4/2019 | Prahlad et al. | |
| 2006/0259728 A1 | 11/2006 | Chandrasekaran et al. | |
| 2006/0277383 A1 | 12/2006 | Hayden et al. | |
| 2009/0037680 A1 | 2/2009 | Colbert et al. | |
| 2009/0144389 A1 | 6/2009 | Sakuta | |
| 2012/0137098 A1 | 5/2012 | Wang et al. | |
| 2015/0193250 A1 | 7/2015 | Ito et al. | |
| 2016/0139962 A1 | 5/2016 | Tsirkin et al. | |
| 2016/0253339 A1 | 9/2016 | Ambrose et al. | |
| 2017/0364394 A1 | 12/2017 | Fujita | |
| 2018/0121305 A1 | 5/2018 | Kameyama et al. | |
| 2018/0285202 A1 | 10/2018 | Bhagi et al. | |

OTHER PUBLICATIONS

Poitras, Steven. "The Nutanix Bible" (Jan. 12, 2016), from nutanixbible.com/.

Poitras, Steven. "The Nutanix Bible" (Oct. 15, 2013), from stevenpoitras.com/the-nutanix-bible/ (Publication date based on indicated capture date by Archive.org; first publication date unknown).

Poitras, Steven. "The Nutanix Bible" (Jun. 20, 2014), from stevenpoitras.com/the-nutanix-bible/ (Publication date based on indicated capture date by Archive.org; first publication date unknown).

Poitras, Steven. "The Nutanix Bible" (Jan. 3, 2017), from nutanixbible.com/.

Poitras, Steven. "The Nutanix Bible" (Sep. 4, 2015), from nutanixbible.com/.

Poitras, Steven. "The Nutanix Bible" (Jan. 7, 2015), from stevenpoitras.com/the-nutanix-bible/ (Publication date based on indicated capture date by Archive.org; first publication date unknown).

Poitras, Steven. "The Nutanix Bible" (Jun. 9, 2015), from stevenpoitras.com/the-nutanix-bible/ (Publication date based on indicated capture date by Archive.org; first publication date unknown).

Poitras, Steven. "The Nutanix Bible" (Jun. 9, 2016), from nutanixbible.com/.

Poitras, Steven. "The Nutanix Bible" (Jun. 8, 2017), from nutanixbible.com/.

Poitras, Steven. "The Nutanix Bible" (Jan. 3, 2018), from nutanixbible.com/.

Poitras, Steven. "The Nutanix Bible" (Jun. 25, 2018), from nutanixbible.com/.

Cano, Ignacio, et al. "Curator: Self-Managing Storage for Enterprise Clusters" (Mar. 27, 2017), from www.usenix.org/conference/nsdi17/.

A. Ruprecht, D. Jones, D. Shiraev, G. Harmon, M. Spivak, M. Krebs, M. Baker-Harvey, T. Sanderson, "VM Live Migration At Scale" ACM SIGPLAN Notices. vol. 53. No. 3. (VEE '18) Mar. 25, 2018.

"Bitmap Indices, Advantages and Disadvantages". Tutorial. web.archive.org/web/20160113144603/https://www.tutorialcup.com/dbms/bitmap-indices.htm>. Published Jan. 13, 2016.

"How can a Virtual Machine be Moved or Migrated?". Oracle. web.archive.org/web/20160508163204/https://docs .oracle .com/cd/E64076_01 /E64081 /html/vmcon-vm-move. html>. Published May 8, 2016.

Deshpande, Umesh et al. "Agile Live Migration of Virtual Machines" IEEE International Parallel and Distributed Processing Symposium (IPDPS '16), published Jul. 21, 2016, pp. 1061-1070, retrieved from DOI: 10.1109/IPDPS.2016.120.

Hirofuchi, Takahiro, et al. "A live storage migration mechanism over wan for relocatable virtual machine services on clouds." Proceedings of the 2009 9th IEEE/ACM International Symposium on Cluster Computing and the Grid. IEEE Computer Society, 2009.

Khanna, Gunjan, et al. "Application performance management in virtualized server environments." Network Operations and Management Symposium, 2006. NOMS 2006. 10th IEEE/IFIP. IEEE, 2006.

Open Invention Network "Open Invention Network Home Page" Open Invention Network LLC (accessed Jan. 16, 2020) from www.openinventionnetwork.com/ (published 2020).

Xu, Qiumin, et al. "Performance analysis of NVMe SSDs and their implication on real world databases." Proceedings of the 8th ACM International Systems and Storage Conference. ACM, 2015.

Zhang, Fei et al., "A Survey on Virtual machine Migration: Challenges, Techniques, and Open Issues" IEEE Communications Surveys & Tutorials (IEEE '18), published Jan. 17, 2018, pp. 1206-1243, vol. 20, No. 2, retrieved from DOI:10.1109/COMST.2018.2794881.

* cited by examiner

MANAGING MEMORY IN DEVICES THAT HOST VIRTUAL MACHINES AND HAVE SHARED MEMORY

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The one or more virtual machines utilize the hardware resources of the underlying one or more host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. Each virtual machine is managed by a hypervisor or virtual machine monitor. Occasionally, the virtual machines may be migrated from one host machine to another host machine. Typically, such migration occurs when the virtual machine is not in use. In some instances, live migration of a virtual machine that is in use is done by copying data stored in memory to the second host machine incrementally until a final data copy can be performed.

SUMMARY

In accordance with at least some aspects of the present disclosure, a method is disclosed. The method includes receiving a request to migrate a first virtual machine from a first host machine to a second host machine. The first host machine includes the first virtual machine, a first hypervisor running the first virtual machine on the first host machine, and a first memory. The second host machine includes a second hypervisor and a second memory. The first host machine and the second host machine are coupled to a shared host physical storage including first swapped out memory data from the first memory, the first swapped out memory data associated with the first virtual machine, and metadata including location information of the first swapped out memory data on the shared host physical memory and an identity of the associated first virtual machine. The method additionally includes initiating, responsive to receiving the request, the migration of the first virtual machine from the first host machine to the second host machine. The method further includes copying, responsive to initiating the migration, memory data associated with the first virtual machine stored in the first memory to the second memory. The method also includes accessing, by the second hypervisor, the metadata stored in the shared host physical storage to determine location of the first swapped out memory data associated with the first virtual machine.

In accordance with another aspect of the present disclosure, a system is disclosed. The system includes a first host machine comprising a first hypervisor, a first virtual machine, and a first memory. The system further includes a second host machine including a second hypervisor and a second memory. The system also includes a shared host physical storage providing access to both the first hypervisor and the second hypervisor, the shared host physical storage including first swapped out memory data from the first memory, the first swapped out memory data associated with the first virtual machine, and metadata including location information of the first swapped out memory data on the shared host physical memory, and an identity of the associated first virtual machine. The first hypervisor is configured to receive a request for migrating the first virtual machine from the first host machine to the second host machine, and initiate, responsive to the receipt of the request, copying of memory data associated with the first virtual memory stored in the first memory to the second memory. The second hypervisor is configured to access the metadata stored in the shared host physical storage to determine location of the swapped out memory data associated with the first virtual machine.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a virtual computing system having a plurality of clusters, with each cluster having a plurality of nodes. Each of the plurality of nodes includes one or more virtual machines managed by an instance of a hypervisor. Occasionally, the one or more virtual machines may be migrated from a first host machine to a second host machine. The virtual machines may be managed by a hypervisor, such as an AHV type of hypervisor provided by Nutanix, Inc.

Migrating a virtual machine from a first host machine to a second host machine includes migrating the data of the first host machine to the second host machine such that when the virtual machine begins operations on the second host machine, the virtual machine has the same configuration and data. In some instances, migration is done when a virtual machine is offline, thereby only necessitating the migration of stored data and configuration settings. However, offline virtual machines result in downtime to a user, which may be unacceptable. Thus, live migration has been implemented to migrate a virtual machine from one host machine to a second host machine. Live migration includes migrating a memory data state from the first host machine to the second host machine such that when the virtual machine operation is transferred to the second host machine, such as via one or more hypervisors, the virtual machine accesses identical memory state data so applications or other processes being executed do not incur errors or faults.

Some live migration processes includes making an initial copy of the memory data to the second host machine memory, then copying changes to the memory data to both location until the virtual machine can be finally migrated at a time to incur minimal downtime. However, such a process can result in lengthy or even impossible live migrations if memory data is frequently changed and/or network data transfer rates are slow. Transfer from a host machine A to a host machine B can include "pre-copy" or "post-copy" transfers. In "pre-copy," the virtual machine is placed in a "logging mode" and all writes to memory are tracked in a log. The hypervisor then copies the memory from host machine A to host machine B as part of an iteration. It then reads and clears the log, starting a further iteration copying only the parts of memory which got modified since the log was last read. These iterations repeat until the state reaches a "convergence" point (i.e. the amount of memory left to copy is relatively small), at which point the VM is suspended on host machine A, a last state copy takes place and the VM is resumed on host machine B. In "post-copy," the virtual machine is migrated from host machine A to host machine B where all (or part) of the memory is only present in host machine A. In the background, the memory is copied from A to B. If the VM tries to read memory which still hasn't been copied, the hypervisor blocks the read and prioritizes pulling the required memory from host machine A.

Some live migration processes also include copying memory data that has been swapped out to storage. Memory data can be swapped out to storage, for example, due to space restrictions. Each virtual machine is allocated a portion of a host physical memory. In some instances, the amount of memory used by the virtual machine may exceed the allocation. In such instances, the hypervisor can swap out a portion of the allocated memory to a host physical storage to free up space in the host physical memory and accommodate the additional memory space requested by the virtual machine. The hypervisor can also maintain a mapping table that includes identities of the pages that have been swapped out to the host physical storage. During migration, the live migration process may have to swap in the swapped out pages from the host physical storage back into the host physical memory, and copy the swapped in pages from host machine A to host machine B. However, swapping in the pages to the host physical memory may cause data currently present in the host physical memory to be swapped out to host physical storage. Once the swapped in data is copied to the host machine B, the recently swapped out data would have to be swapped back in to the host physical memory before being copied to host B. As each swap in and swap out operation involves input/output operations to the host physical storage, copying memory that has been swapped out can cause multiple I/O operations to the host physical storage. These multiple I/O operations can result in a delay in the migration of memory data from host machine A to host machine B. In addition, the multiple I/O operations can increase the stress on the host physical storage, thereby increasing the risk of failure of the host physical storage.

Accordingly, the present disclosure provides solutions to the aforementioned technical problems. In particular, the present disclosure provides for sharing the host physical storage over multiple host machines. During migration, the data form the memory at the host machine A is transferred to the memory at the host machine B. However, the memory data that is swapped out to the host physical storage is not swapped back in to the memory of the host machine A before being copied to the memory of the host machine B. Instead, the hypervisor at host machine A can indicate to the hypervisor of the host machine B that the shared host physical storage includes swapped out. The shared host physical storage can store mapping information that when accessed by the hypervisor at the host machine B provides the locations of the memory blocks that store the swapped out memory data from the memory of the host machine A. The hypervisor at the host machine B can update its mapping tables to indicate the identities of the pages that have been swapped out and the locations in the shared host physical memory where the swapped pages reside. In this manner, the swapped out data does not have to be actually transferred from the host machine A to the host machine B. Instead, the swapped out data remains in the shared host physical storage, and is accessed by the hypervisor in the host machine B. By alleviating the need for swapping in the swapped out memory data, the delay in migrating the virtual machine is reduced. In addition, by alleviating the need for swapping in the swapped out memory data, the number of I/O operations on the host physical storage are reduced, thereby reducing the stress on the host physical storage, and reducing the risk of failure of the host physical storage.

Figure 1:
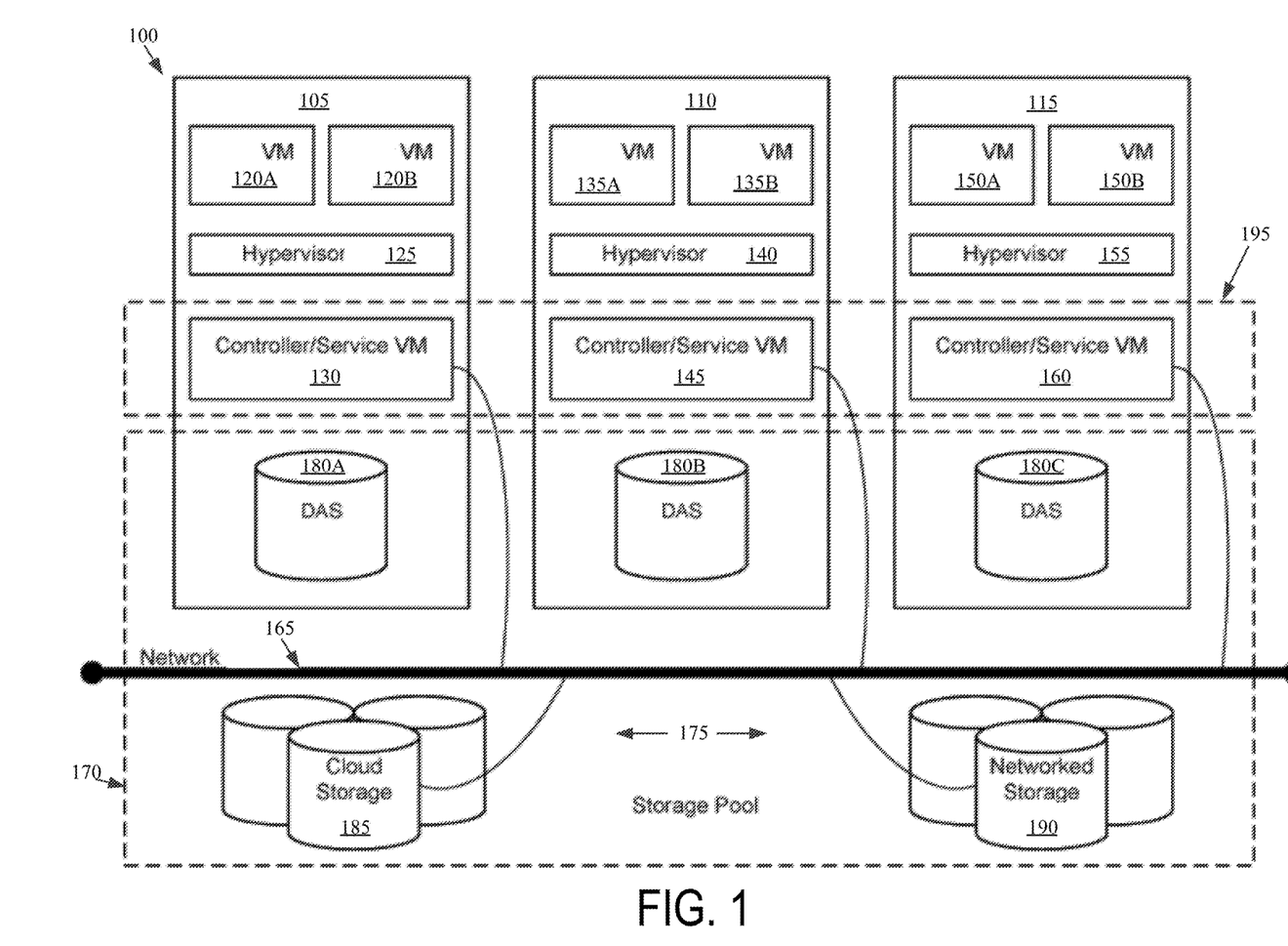
FIG. 1 is a block diagram of a virtual computing system, in accordance with some embodiments of the present disclosure.

Referring now to FIG. 1, a virtual computing system 100 is shown, in accordance with some embodiments of the present disclosure. The virtual computing system 100 includes a plurality of nodes, such as a first node 105, a second node 110, and a third node 115. The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 may be accessible via the network 165 and, in some embodiments, may include cloud storage 185, as well as local storage area network 190. In contrast to the network-attached storage 175, which is accessible via the network 165, the direct-attached storage 180A, 180B, and 180C may include storage components that are provided within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system to perform the functions described herein are contemplated and considered within the scope of the present disclosure. Additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150). Additionally, more than a single instance of the hypervisor (e.g., the hypervisor 125, the hypervisor 140, and the hypervisor 155) and/or the controller/service VM (e.g., the controller/service VM 130, the controller/service VM 145, and the controller/service VM 160) may be provided on the first node 105, the second node 110, and/or the third node 115.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may also be organized in a variety of network topologies, and may be termed as a "host" or "host machine."

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory (ROM) device and copy the instructions in an executable form to a temporary memory device that is generally some form of random access memory (RAM). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk (CD), digital versatile disk (DVD), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170 including the network-attached storage 175 and the direct-attached storage 180A, 180B, and 180C may together form a distributed storage system configured to be accessed by each of the first node 105, the second node 110, and the third node 115 via the network 165, the controller/service VM 130, the controller/service VM 145, and the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, respectively, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a local management system (e.g., Prism Element from Nutanix, Inc.) configured to manage various tasks and operations within the virtual computing system 100.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc., for running the user VMs 120, the user VMs 135, and the user VMs 150, respectively, and for managing the interactions between the user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. The leader node may also be configured to receive and handle requests (e.g., user requests) from outside of the virtual computing system 100. If the leader node fails, another leader node may be designated. Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Further, in some embodiments, although not shown, the virtual computing system 100 includes a central management system (e.g., Prism Central from Nutanix, Inc.) that is configured to manage and control the operation of the various clusters in the virtual computing system. In some embodiments, the central management system may be configured to communicate with the local management systems on each of the controller/service VM 130, the controller/service VM 145, and the controller/service VM 160 for controlling the various clusters.

Again, it is to be understood again that only certain components of the virtual computing system 100 are shown and described herein. Nevertheless, other components that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2:
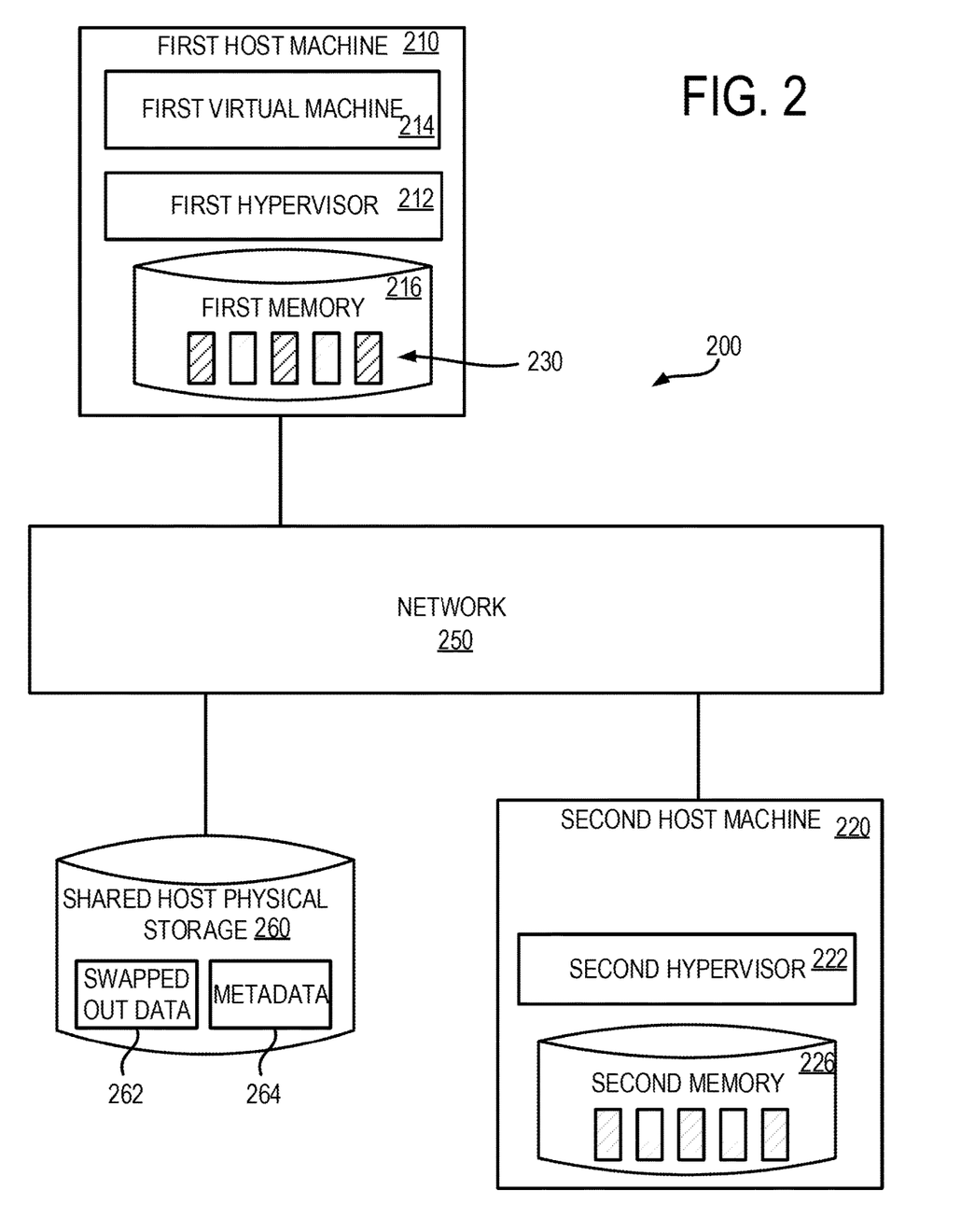
FIG. 2 depicts a block diagram of a system having a first host machine, a second host machine, and a shared hots physical storage, in accordance with some embodiments of the present disclosure.

Turning to FIG. 2, a block diagram of a system 200 with a first host machine 210 and a second host machine 220 connected via a network 250 for live migration is shown, in accordance with some embodiments of the present disclosure. For live migration, the data in a first memory 216 of the first host machine 210 needs to be copied to a second memory 226 of the second host machine 220. For example, the first memory 216 includes first memory data 230 (depicting by hashing) written to it that corresponds to the first virtual machine 214, and would need to be copied to the second memory 226 for migrating the first virtual machine 214 to the second host machine 220. Once the memory data is copied, the first virtual machine 214 can be migrated to the second host machine 220. Some of the data in the first memory 216 of the first host machine 210 may be swapped out to a host physical storage, such as the shared host physical storage 260. The data may be swapped out, in part, due to size constraints on the first memory 216 of the first host machine 210. The first hypervisor 212 of the first host machine 210 may allocate a portion of the first memory 216 to the first virtual machine 214 and any other virtual machines (not shown) running on the first host machine 210. The size of allocation can be based on the size of the first memory 216 and the size of the memory requested by the first virtual machine 214.

In some instances, the requested memory size by the first virtual machine 214 can exceed the corresponding allocated size of the portion of the first memory 216. In such instances, the first hypervisor 212 may swap out some of the data from the portion of the first memory 216 allocated to the first virtual machine 214 to the shared host physical storage 260. The swapped out data can correspond to processes that are not currently running on the first virtual machine 214 or may data that is relatively older. Thus, during migration of the first virtual machine 214 from the first host machine 210 to the second host machine 220, merely transferring the data in the first memory 216 associated with the first virtual machine 214 to the second memory 226 may not be sufficient. The second hypervisor 222 may need to know where the swapped out data associated with the first virtual machine 214 is stored in the shared host physical storage 260, so that when the swapped out data is requested by processes running on the migrated first virtual machine 214, the second hypervisor 222 has the ability to swap in that data back into the second memory 226.

In the implementation shown in FIG. 2, the first host machine 210 includes the first virtual machine 214 executing on the first host machine 210 and utilizing the first memory 216 to store data. The first memory 216 can represent the host physical memory, of the first host machine. The host physical memory can be part of the hardware resources, which may also include host physical processors and host physical input/output devices, that the first hypervisor 212 shares with the virtual machines, such as the first virtual machine 214, running on the first host machine 210. The first hypervisor 212 can present guest physical memories, guest physical processors, and guest physical I/O devices, to the guest operating system(s) running on the first virtual machine 214. The first hypervisor 212 can map the guest physical memories of the first virtual machine 214 or other virtual machines running on the first host machine 210 to the first memory 216. In particular, the first hypervisor 212 can allocate portions of the first memory 216 to the guest physical memories of the virtual machines running on the first host machine. For example, the first hypervisor 212 can allocate a portion of the first memory 216 to the gust physical memory of the first virtual machine 214. The first hypervisor 212 can maintain a mapping table that maps the address space of a guest physical memory to the address space on the portion of the first memory 216 allocated to that guest physical memory. Thus, when the operating system running on the first virtual machine 214 generates a request to access data (read/write) on its guest physical memory, the first hypervisor 212 can use the mapping information to determine the actual location of the requested data on the first memory 216.

The first memory 216 may include, but is not limited to, any permanent memory device like a read only memory (ROM) device, temporary memory device such as random access memory (RAM) any type of magnetic storage devices (e.g., hard disk, floppy disk, magnetic strips, etc.), optical disks (e.g., compact disk (CD), digital versatile disk (DVD), etc.), smart cards, solid state devices, etc. The first host machine 210 can be analogous to host machine 105, 110, 115 discussed with respect to FIG. 1 above. In the implementation shown, the first host machine 210 is in communication with a network 250. The network 250 can also be analogous to the network 165 discussed with respect to FIG. 1 above.

The second host machine 220 includes a second memory 226 and a second hypervisor 222. The second memory 226 can be similar to the first memory 216 discussed above in relation to the first host machine 210. That is, the second memory 226 can represent a host physical memory for the second host machine 220. The second hypervisor 222 can create and run one or more virtual machines on the second host machine 220, and can allocate portions of the second memory 226 to guest physical memories associated with the one or more virtual machines. The second host machine 220 can be a target host machine, where the first virtual machine 214 can be migrated. The second memory 226 may include, but is not limited to, any permanent memory device like a read only memory (ROM) device, temporary memory device such as random access memory (RAM) any type of magnetic storage devices (e.g., hard disk, floppy disk, magnetic strips, etc.), optical disks (e.g., compact disk (CD), digital versatile disk (DVD), etc.), smart cards, solid state devices, etc.

The shared host physical storage 260 may include, but is not limited to, storage devices, (e.g., hard disk, floppy disk, magnetic strips, etc.), optical disks (e.g., compact disk (CD), digital versatile disk (DVD), etc.), smart cards, solid state devices, etc. The shared host physical storage 260 can be shared with one or more host machines. For example, the shared host physical storage 160 can be shared by the first host machine 210 and the second host machine 220. In particular, both the first hypervisor 212 of the first host machine 210 and the second hypervisor 222 of the second host machine 220 can have read and write access to the shared host physical storage 260. The shared host physical storage 260 can store data associated with the first host machine 210 and data associated with the second host machine 220. The data can include file systems, databases, computer programs, applications, etc. The shared host physical storage 260 can also include the swapped out data from the first memory 216 and the second memory 226 of the first and second host machines 210 and 220, respectively. In some embodiments, the shared host physical storage 260 may include only swapped out memory data 262 from the host machines, and metadata that includes information regarding the locations of the swapped out memory data 262 on the shared host physical storage 260. In some such embodiments, the shared host physical storage 260 can be partition of a larger storage device or pool.

Figure 3:
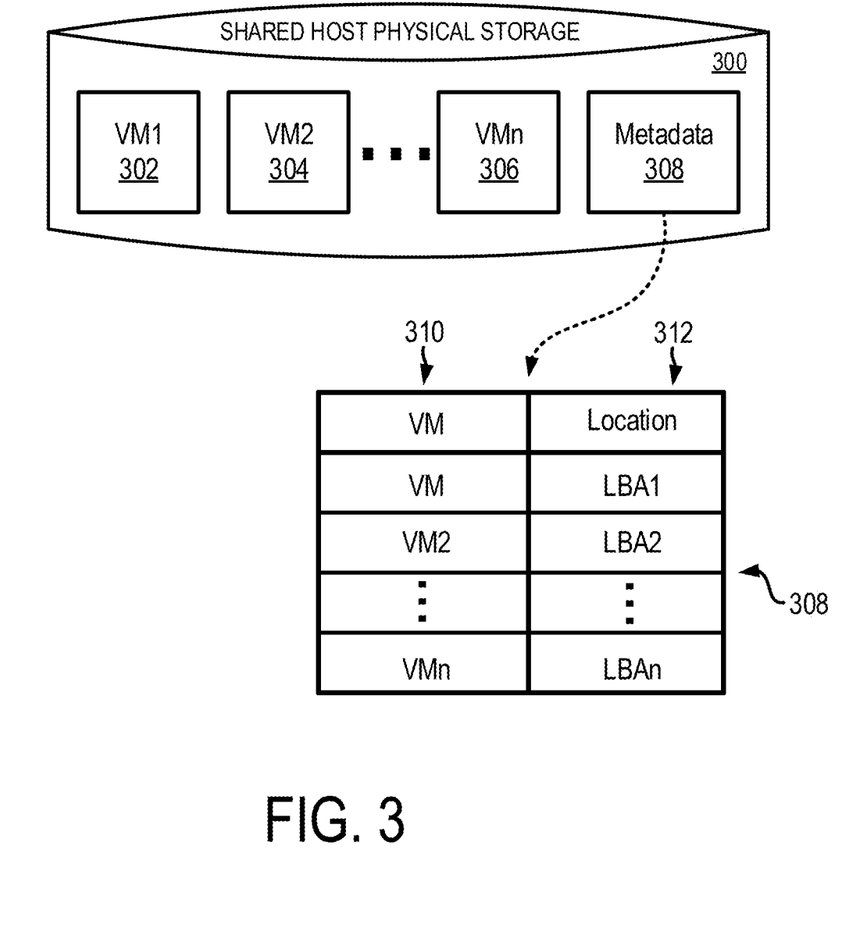
FIG. 3 shows a block diagram of an example shared host physical storage of the system of FIG. 2, in accordance with some embodiments of the present disclosure.

FIG. 3 shows a block diagram of an example shared host physical storage 300. The shared host physical storage 300 includes swapped out memory data associated with one or more virtual machines. For example, a first portion 302 includes swapped out memory data associated with a first virtual machine, a second portion 304 includes swapped out memory data associated with a second virtual machine, and an n-th portion 306 includes swapped out memory data associated with an n-th virtual machine. The first, second, and n-th virtual machines can be analogous to the first virtual machine 214 shown in FIG. 2. The shared host physical storage 300 also includes metadata 308 that includes information regarding the locations of each of the first, second, and n-th portions. The first, second, and the n-th portions 302, 304, and 306, of the shared host physical storage 300 can have different sizes based on the amount of memory associated with the respective virtual machine is swapped out to the shared host physical storage 300. Each portion can be stored in a continuous address space on the shared host physical storage 300 or can be distributed over two or more blocks of the shared host physical storage 300.

FIG. 3 also shows example metadata 308 including a first column 310 identifying a virtual machine, and a second column 312 including the location of the portion of the shared host physical storage 300 where the swapped out memory data associated with that virtual machine is stored. As an example, the first column can include the identities of the first virtual machine VM1, the second virtual machine VM2, and the n-th virtual machine VMn in the first column 310. The second column 312 can include the address of the blocks where the memory data is stored. In some embodiments, the second column 312 can include the logical block addresses (LBAs) of the blocks where the swapped out memory data of the associated virtual machine is stored. In some embodiments, more than one LBAs can be included to indicate distributed or discontinuous portions on the shared host physical storage 300 that store the swapped out memory data. In some embodiments, the first column can include guest physical addresses of a particular virtual machine and the corresponding locations in the shared host physical storage 300 of the swapped out data from those addresses. The guest physical addresses can represent the addresses or range of addresses in the guest physical memory at the virtual machine.

A target hypervisor, such as the second hypervisor 222 of the second host machine 220 can access the metadata 308 of the shared host physical storage 300 to determine the locations of the swapped out memory data associated with the migrated virtual machines. This information can be used by the second hypervisor 222 to update swap tables stored in memory that map the pages that have been swapped out to the location in the shared host physical storage 300 where the swapped out pages are stored. As the shared host physical storage 300 is shared between the source hypervisor and the target hypervisor, the virtual machine can be migrated to the target host machine without having to swap in the memory data from storage into the source memory and then copying the data to the target memory.

Figure 4:
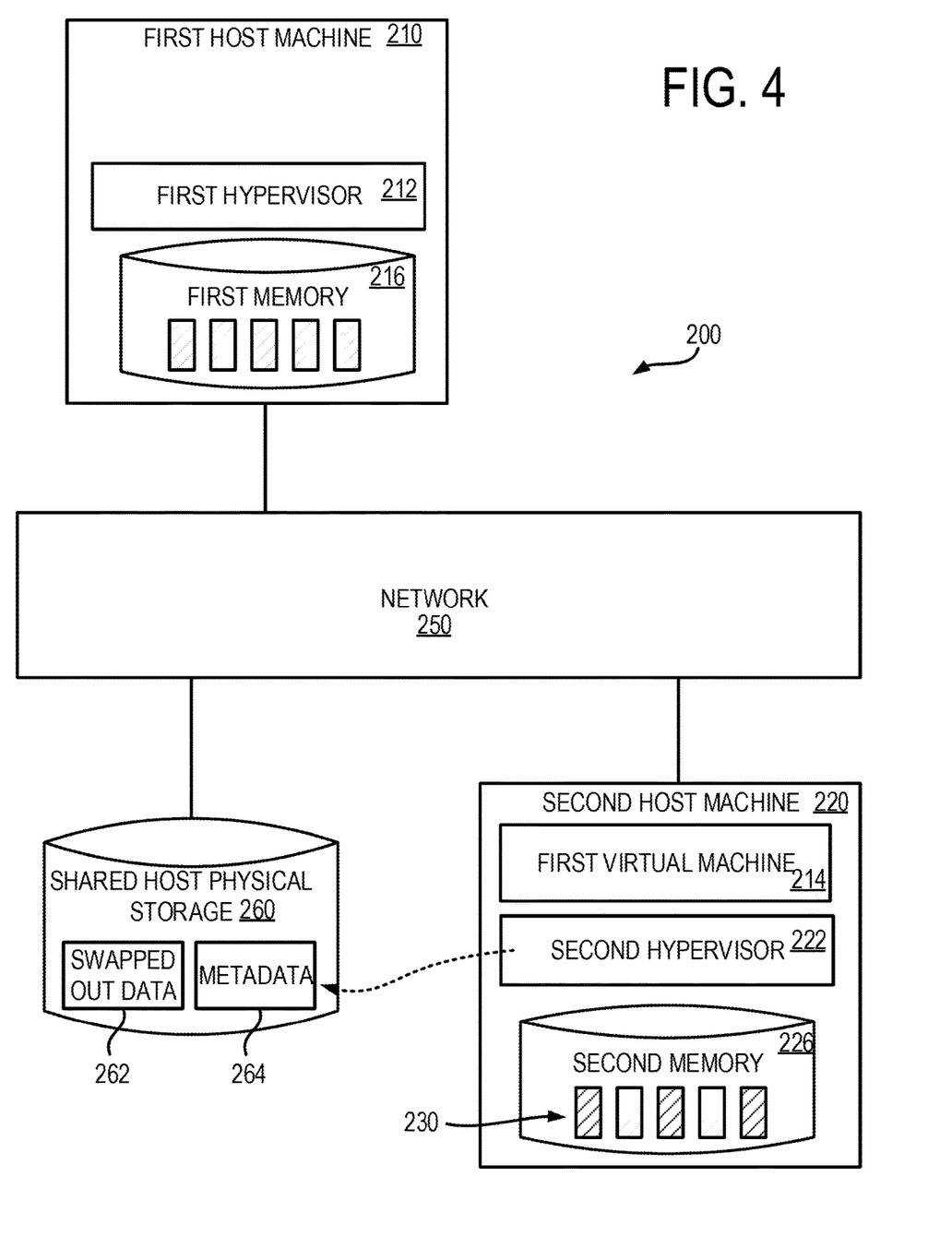
FIG. 4 shows an example live migration of a virtual machine from a first host machine to a second host machine of the system of FIG. 2, in accordance with some embodiments of the present disclosure.

FIG. 4 shows an example live migration of a virtual machine from a first host machine to a second host machine. In particular, FIG. 4 shows a stage in the live migration of the first virtual machine 214 from the first host machine 210 to the second host machine 220. To migrate the first virtual machine 214, the first memory data 230 associated with the first virtual machine 214 stored in the first memory 216 is copied to the second memory 226 of the second host machine 220. The copying of the first memory data 230 from the first memory 216 to the second memory 226 can be carried out in a manner such that the first virtual machine 214 is still operational. That is, the processes running on the first virtual machine 214 experience no or very low disruption during the live migration. To ensure low levels of disruption, the first memory data 230 can be copied in several ways.

In one approach, prior to copying, the first memory data 230 can be copied using a "pre-copy" method. The first virtual machine 214 can be placed in a "logging mode" and all writes to from the first virtual machine 214 to the first memory 216 can be tracked in a log. The first hypervisor 212 can then copy the first memory data 230 from the first memory 216 to the second memory 226 of the second host machine 220. The first hypervisor 212 can then read and clear the log, and begin an iteration of copying only that memory data associated with the first virtual machine 214 that has been modified after the last time the log was read. The first hypervisor 212 can copy the modified data and clear the log again. Thereafter, the first hypervisor 212 can again check for modified data since the last log read to identify modified memory data. The first hypervisor 212 can continue to iteratively copy modified data until the log indicates that no modified data is remaining. At this point, the first virtual machine 214 can be suspended on the first host machine 210, and is resumed on the second host machine 220 along with a last state copy.

In another approach, the first memory data 230 can be copied using a "post-copy" method. The first hypervisor 212 can migrate the first virtual machine 214 from the first host machine 210 to the second host machine 220, such that all or part of the first memory data 230 is retained in the first memory 216 of the first host machine 210. In the background, portions of the first memory data 230 are copied from the first memory 216 to the second memory 226. If the first virtual machine 214, which is now operating on the second host machine 220, tries to read portions of the first memory data 230 that have yet to be copied to the second memory 226, the second hypervisor 222 blocks the reads and prioritizes the copying of the requested portions of the first memory data 230 from the first memory 216 to the second memory 226. Over time, all of the first memory data 230 can be copied to the second memory 226. Other approaches to copying the first memory data 230 from the first memory 216 to the second memory 226 also can be utilized.

In addition to copying the first memory data 230 from the first memory 216 to the second memory 226, the second hypervisor 222 also determines the location on the shared host physical storage 260 where the swapped out data from the first memory 216 is stored. In particular, the second hypervisor 222 can determine the location on the shared host physical storage 260 where the swapped out data associated with the first virtual machine 214 is stored. The second hypervisor 222 can access the shared host physical storage 260 via the network 250 and read the metadata 264. As shown in FIG. 3, the metadata can include information regarding the locations of the data blocks that store swapped out data associated with each virtual memory. For example, the second hypervisor 222 can use the metadata to determine the LBAs of the data blocks on the shared host physical storage 260 where the swapped out data associated with the first virtual machine 214 (VM1) is stored. In some embodiments, the second hypervisor 222, as part of the migration process, can receive the location of the metadata on the shared host physical storage 260, which the second hypervisor 222 can use to identify the location of the swapped out memory data associated with the first virtual machine 214.

The metadata for mapping a page to the block (LBA) is in swapped out memory only, thus it needs to be transmitted by the first hypervisor 212 to the second hypervisor 222. For example, when sending data for page P to the second hypervisor 222, instead of sending the memory contents, the LBA of contents on the shared storage is sent instead. The receiving hypervisor updates the mapping table to point page P to this LBA. At the start of the migration process, the first hypervisor 212 informs the second hypervisor 222 which shared swap device is used for the VM.

Once the second hypervisor 222 identifies the location of the swapped out memory data, the second hypervisor 222 can successfully handle any page faults generated by the migrated first virtual machine 214. That is, a process in the first virtual machine 214 may make a read/write request for an address space in the second memory 226 that has been swapped out to the shared host physical storage 260. This read/write request can generate a page fault. The second hypervisor 222 can determine the location on the shared host physical storage 300 where the swapped out data associated with the requested address space is stored on the shared host physical storage 300. The second hypervisor 222 can swap in the swapped out data to the second memory 226, clear the page fault, and allow the process requesting the data to proceed with the read/write request.

Figure 5:
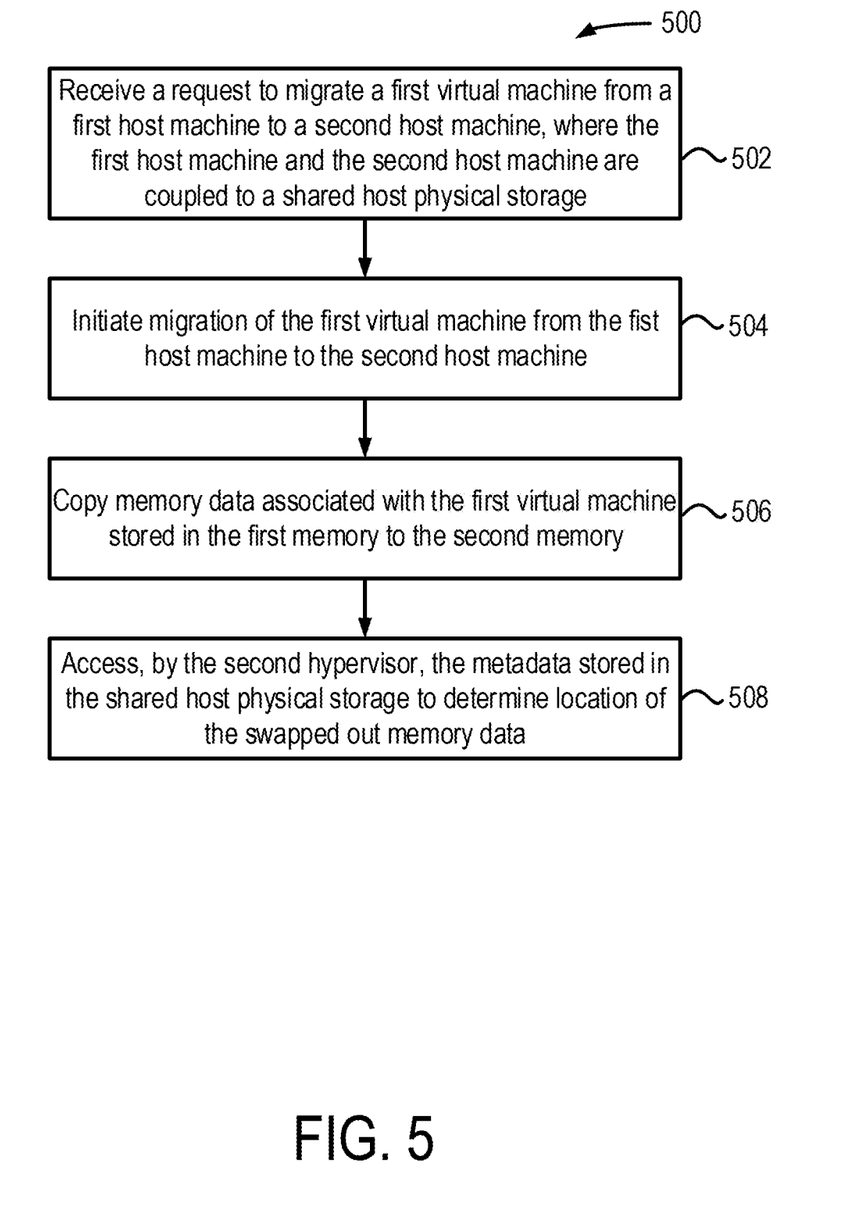
FIG. 5 shows a flowchart outlining a process for live migration of a virtual machine from a first host machine to a second host machine of the system of FIG. 2, in accordance with some embodiments of the present disclosure.

Turning now to FIG. 5, a flowchart outlining a process 500 for live migrating a virtual machine, such as the first virtual machine 214, from a first host machine, such as the first host machine 210, to a second host machine, such as the second host machine 220, is shown, in accordance with some embodiments of the present disclosure. The process 500 may include additional, fewer, or different operations, depending on the particular embodiment. Further, the process 500 is described in conjunction with FIGS. 2-4.

The process 500 includes receiving a request to migrate a first virtual machine from a first host machine to a second host machine, where the first host machine and the second host machine are coupled to a shared host physical storage (502). As an example, the request for the migration can be received by the first host machine 210. Specifically, the request could be received by the first hypervisor 212 or a controller virtual machine (such as the controller/service VM 130 show in FIG. 1) of the first host machine 210. The first host machine 210 includes the first virtual machine 214, a first hypervisor 212 and a first memory 216. The first hypervisor 212 runs the first virtual machine 214 on the first host machine 210. The first hypervisor 212 provides the first virtual machine 214 guest physical processors and guest physical memories, which are virtual processors and virtual memories, mapped to host physical processors (not shown) and host physical memories such as the first memory 216. The second host machine 220 includes a second hypervisor 222 and a second memory 226. The second hypervisor 222 that can virtualize the second memory 226 and present as guest physical memories to potential virtual machines running on the second host machine 220.

Further, the first host machine and the second host machine are coupled to the shared host physical storage. For example, the first host machine 210 and the second host machine 220 are coupled to the shared host physical storage 260 over the network 250. As discussed above in relation to FIG. 3, the shared host physical storage 260 can include first swapped out memory data from the first memory. For example, as shown in FIG. 3, the shared host physical storage 260 includes portions 302-308 that store swapped out memory data associated with various virtual machines. The shared host physical storage 260 also includes metadata that stores location information of the swapped out data. For example, the metadata can include a table that includes location information in the form of LBAs of the swapped out memory data associated with various virtual machines. The shared host physical storage 260 can be shared between the first host machine 210 and the second host machine 220 over the network 250.

The process 500 further includes initiating migration of the first virtual machine from the first host machine to the second host machine (504). As an example, the first hypervisor 212 can receive a request to initiate the migration of the first virtual machine 214 from the first host machine 210 to the second host machine 220. In some embodiments, a controller/service VM, such as the controller/service VMs 130, 140, and 160 can receive a request for migrating one or more virtual machines.

The process 500 also includes copying memory data associated with the first virtual machine stored in the first memory to the second memory (506). For example, as shown in FIG. 4, the first memory data 230 associated with the first virtual machine 214 is copied from the first memory 216 to the second memory 226. The copying of the first memory data 230 can be carried out using a number of techniques such as pre-copy or post-copy discussed above.

The process 500 further includes accessing, by the second hypervisor, the metadata stored in the shared host physical storage to determine location of the swapped out memory data (508). As discussed above in relation to FIG. 4, the second hypervisor 222 can access the metadata 264 stored in the shared host physical storage 260 to determine location information for the swapped out memory data associated with the migrated first virtual machine 214. The second hypervisor 222 can utilize the metadata to update one or more mapping tables maintained by the second hypervisor 222, such as a swap table, with the location information provided by the metadata. In this manner, the swapped out data associated with the first virtual machine 214, which is migrated from the first host machine 210 to the second host machine 220 is not first read into the first memory 216 before being transferred to the second memory 226. Instead, by sharing the shared host physical storage 260 and by maintaining metadata 264 on the shared host physical storage 260, the second hypervisor 222 can readily access the swapped out memory data associated with the migrated first virtual machine 214. By avoiding the swapping in of the swapped out memory data, the delay time associated with the migration of the first virtual machine 214 is reduced. Further, the number of I/O operations to the shared host physical storage 260 are reduced, thereby reducing the stress and risk of failure of the shared host physical storage 260.

Although the present disclosure has been described with respect to software applications, in other embodiments, one or more aspects of the present disclosure may be applicable to other components of the virtual computing system 100 that may be suitable for real-time monitoring by the user.

It is also to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
    receiving, by a first host machine, a request to migrate a virtual machine (VM) from the first host machine to a second host machine;
    in response to the request to migrate;
        copying memory data associated with the VM from a first memory on the first host machine to a second memory on the second host machine;
        receiving, by the second host machine, location of a metadata stored in a remote shared storage associated with the first host machine and the second host machine, wherein the metadata includes address information of where swapped-out memory data of the first host machine are located on only the shared storage;
        accessing, by the second host machine, the metadata using the received location of the metadata in the shared storage;
        updating, by the second host machine, a mapping table on the second host machine using the address information of the metadata in the shared storage without transferring the metadata to the second host machine; and
        upon generation of a page fault by the migrated virtual machine associated with data of the swapped-out memory data of the first host machine, determining, by the second host machine, location of the data associated with the page fault from the mapping table and retrieving the data from the shared storage.

2. The method of claim 1, wherein the location includes at least one logical block address on the shared storage.

3. The method of claim 1, wherein the shared storage includes swapped out memory data that is copied to the second memory before swapping into the first memory.

4. The method of claim 1, further comprising:
    detecting the page fault by the virtual machine on the second host machine; and
    accessing the location in the shared storage to swap in at least a portion of swapped out memory data into the second memory.

5. The method of claim 1, further comprising:
    suspending an operation of the VM on the first host machine and beginning the operation of the VM on the second host machine after copying the memory data to the second memory.

6. The method of claim 1, further comprising:
    suspending an operation of the VM on the first host machine; and
    before copying swapped out memory data to the second memory, beginning operation of the VM on the second host machine.

7. A system comprising:
    a shared storage associated with a first host machine and a second host machine, wherein a first portion of memory data of a virtual machine is stored in a first memory on the first host machine and a second portion of the memory data is stored in the shared storage wherein the first host machine copies the first portion to a second memory on the second host machine in response to a request to migrate the virtual machine from the first host machine to the second host machine;
    wherein in response to the request to migrate the virtual machine;

the first host machine does not copy the second portion from the shared storage to the second memory;

the second host machine receives a location of a metadata stored in a remote shared storage associated with the first host machine and the second host machine, wherein the metadata includes address information of where swapped-out memory data of the first host machine are located on only the shared storage;

the second host machine accesses the metadata using the received location of the metadata in the shared storage;

the second host machine updates a mapping table using address information from metadata in the shared storage without transferring the metadata to the second host machine; and upon generation of a page fault by the migrated virtual machine associated with data of the swapped-out memory data of the first host machine, the second host machine uses location information of the data associated with the page fault from the mapping table to access data in the shared storage during the page fault.

8. The system of claim 7, wherein the location includes at least one logical block address on the shared storage.

9. The system of claim 7, wherein the second host machine accesses the mapping table during the page fault to determine location of the second portion in the shared storage.

10. The system of claim 9, wherein the second host machine further copies at least a portion of the second portion from the shared storage to the second memory in response to the page fault.

11. The system of claim 7, wherein the first host machine further:
suspends, responsive to the request to migrate, an operation of the virtual machine on the first host machine after copying the first portion to the second memory.

12. The system of claim 7, wherein the second host machine further:
before copying swapped out memory data to the second memory, begin an operation of the virtual machine on the second host machine.

13. A non-transitory computer-readable media having computer-readable instructions stored thereon that, when executed by a processor, cause the processor to perform a process comprising:
receiving a request to migrate a virtual machine (VM) from a first host machine to a second host machine;
in response to the request to migrate:
copying first memory data associated with the VM and stored in a first memory on the first host machine to a second memory on the second host machine;
receiving, by the second host machine, location of a metadata stored in a remote shared storage associated with the first host machine and the second host machine, wherein the metadata includes address information of where swapped-out memory data of the first host machine are located on only the shared storage;
accessing, by the second host machine, the metadata using the received location of the metadata in the shared storage;
updating, by the second host machine, a mapping table on the second host machine using the address information of the metadata in the shared storage without transferring the metadata to the second host machine; and
upon generation of a page fault by the migrated virtual machine associated with data of the swapped-out memory data of the first host machine, using location information of the data associated with the page fault from the mapping table to access data in the shared storage during the page fault.

14. The non-transitory computer-readable media of claim 13, further comprising computer-readable instructions for:
accessing metadata stored in the shared storage for determining a location of the second memory data.

15. The non-transitory computer-readable media of claim 13, further comprising computer-readable instructions for copying the second memory data to the second memory and then copying the second memory data to the first memory.

16. The non-transitory computer-readable media of claim 13, further comprising computer-readable instructions for:
detecting the page fault by the VM on the second host machine; and
copying at least a portion of the second memory data into the second memory from the shared storage in response to the page fault.

17. The non-transitory computer-readable media of claim 13, further comprising computer-readable instructions for:
suspending, responsive to the request to migrate, an operation of the VM on the first host machine after copying the first memory data to the second memory.

18. The non-transitory computer-readable media of claim 13, further comprising computer-readable instructions for:
copying the second memory data to the second memory and then beginning an operation of the VM on the second host machine.

19. The non-transitory computer-readable media of claim 13, wherein the page fault is generated by the VM being migrated.

20. The non-transitory computer-readable media of claim 19, wherein the page fault is generated by the VM making a read/write request for an address space in the second memory that has been swapped out to the shared storage.

21. The non-transitory computer-readable media of claim 13, further comprising computer-readable instructions for swapping in second memory data to the second memory and clearing the page fault.

22. The non-transitory computer-readable media of claim 21, further comprising computer-readable instructions for requesting data to proceed with a read/write request after the page fault is cleared.

* * * * *